United States Patent [19]

Lindsay

[11] Patent Number: 5,716,062
[45] Date of Patent: Feb. 10, 1998

[54] CAMERA PEDESTALS

[75] Inventor: Richard Arthur Lindsay, Suffolk, United Kingdom

[73] Assignee: Vitec Group, plc., London, England

[21] Appl. No.: 464,610

[22] PCT Filed: Jan. 12, 1994

[86] PCT No.: PCT/GB94/00059

§ 371 Date: Aug. 8, 1995

§ 102(e) Date: Aug. 8, 1995

[87] PCT Pub. No.: WO94/16357

PCT Pub. Date: Jul. 17, 1994

[30] Foreign Application Priority Data

Jan. 12, 1993 [GB] United Kingdom ............. 9300496

[51] Int. Cl.⁶ .................................................. B62B 1/08
[52] U.S. Cl. ................................... 280/47.11; 280/47.41
[58] Field of Search ............................ 280/47.11, 47.34, 280/47.41, 848, 87.01, DIG. 1; 414/590; 248/183, 188.2

[56] References Cited

U.S. PATENT DOCUMENTS 2,661,672 12/1953 Fairbanks ..................... 280/47.11
3,087,630 4/1963 Karnow et al. ................ 414/590
4,095,250 6/1978 Giglioli ......................... 354/293
5,312,121 5/1994 Chapman ...................... 280/47.11

FOREIGN PATENT DOCUMENTS 33 34 428   4/1985   Germany.
39 18 101  12/1990   Germany.
836057      6/1960   United Kingdom.
WO 92/06034 4/1992   WIPO ....................... 280/47.11

Primary Examiner—Brian L. Johnson
Assistant Examiner—Jonathan E. Butts
Attorney, Agent, or Firm—Kenyon & Kenyon

[57] ABSTRACT

A pedestal for a TV, video, or cinematograph camera having a base mounted on steerable wheel units. The carrier comprises a counter-balanced arm mounted on the base for rotation about a vertical axis and tiltable about a horizontal axis, the steering mechanism is coupled to the arm and steerable wheel units so that rotation of the arm about the vertical axis causes a corresponding steering movement of the wheel units and the direction in which the steerable wheel units are steered is in alignment with the horizontal direction of the arm so that as the base is moved by an operator in a horizontal direction, the pedestal follows that direction.

11 Claims, 1 Drawing Sheet

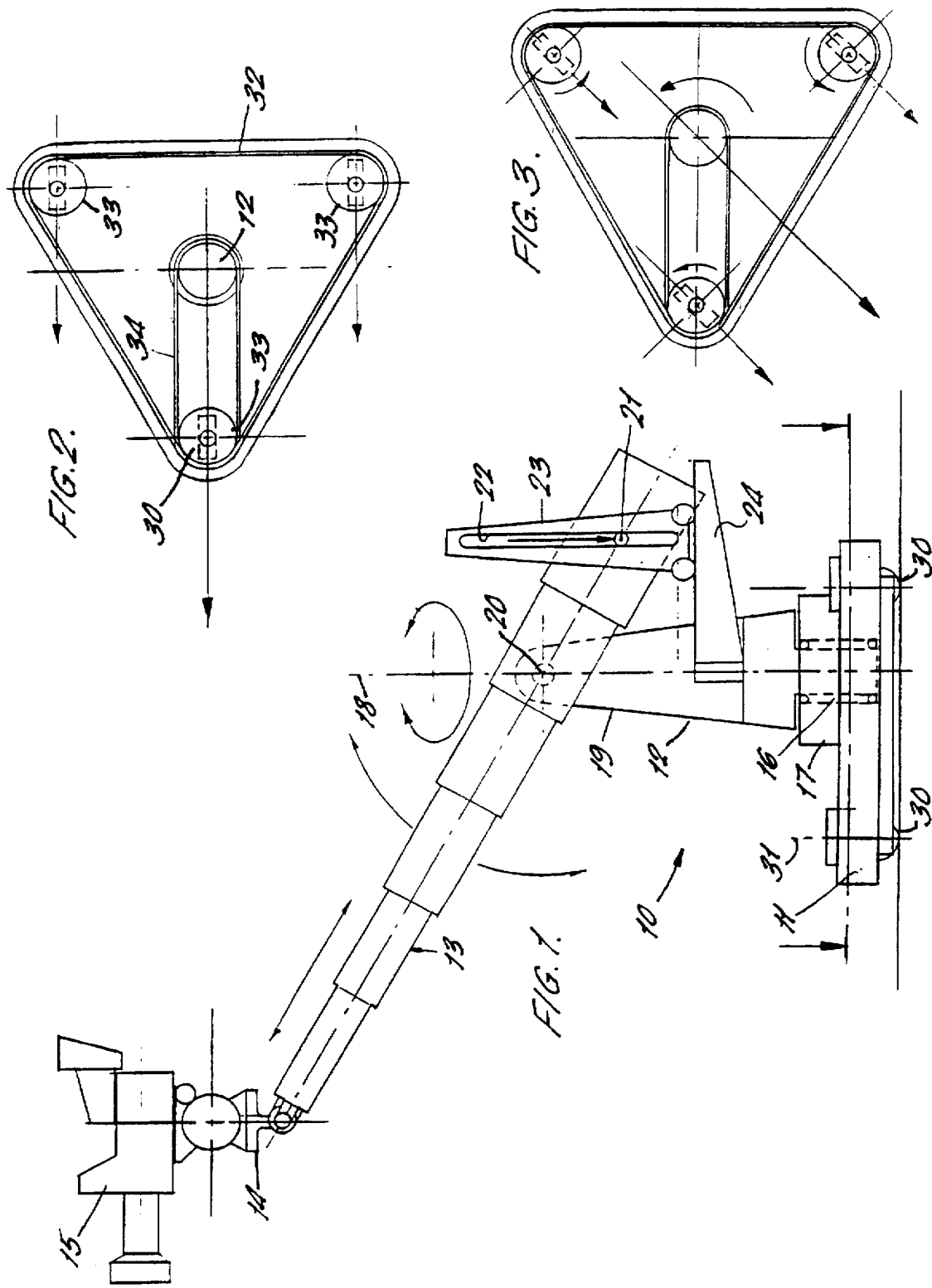

CAMERA PEDESTALS

BACKGROUND OF THE INVENTION

This invention relates to camera pedestals and is particularly applicable, although not exclusively, to a pedestal described and illustrated in our EP-A-94900957.5.

U.S. Pat. No. 4,095,250 discloses a steerable camera carriage comprising a triangular base having upright shafts rotatably supported at each of its corners. Each shaft has a support wheel for the carriage below the base and a camera mounting above the base. An upright steering column is mounted centrally on the base with an encircling steering wheel at its upper end and, below the base, a drive sprocket arrangement coupling the column to the corner shaft for steering the base and/or directing the camera. Thus, the steering wheel can be rotated so that a selected camera is directed to view the-subject to be photographed.

DE-A-3918101 discloses a mobile dolly having a vertically extending lifting column mounted on an chassis and having a horizontally extending jib pivotally mounted on the upper end of the column above the horizontal axis. One end of the jib has a platform for supporting a camera and, optionally, a cameraman seat. The other end of the jib carries a counterweight for balancing the weight of the camera/cameraman.

SUMMARY OF THE INVENTION

This invention provides a pedestal for a TV, video, or cinematograph camera having a base mounted on steerable wheel units, means for steering the wheel units for moving the base in a desired direction and a carrier for supporting a camera on the base; characterized in that the carrier comprises a counter-balanced arm mounted on the base for rotation about a vertical axis and to tilt about a horizontal axis, the steering means being coupled to the arm and the steerable wheel units so that rotation of the arm about said vertical axis causes a corresponding steering movement of the wheel units and the direction in which the steerable wheel units are steered is in alignment with the horizontal direction of the arm so that as the base is moved by an operator in said horizontal direction, the pedestal follows that direction.

Preferably the base is supported on a number of spaced steerable wheel units all of which are rotatably mounted on the base for steering about vertical axes and at least certain of which are coupled to the rotary mounting of the arm to be steered thereby.

More specifically all of the steerable wheel units may be coupled to the rotary mounting to be steered thereby so that all of the wheel units are aligned in parallel with one another and are steered collectively.

The base may be of triangular form having steerable wheel units at each apex thereof.

By way of example a belt or chain drive may interconnect the steerable wheel units to steer together.

In the latter arrangement drive means may be provided for connecting the rotary mounting of the arm to one of the steerable wheel units to transmit rotation of the mounting with the arm to the steerable units.

In one particular construction according to the invention the drive means between the rotary mounting and the steerable unit may comprise a toothed belt/chain drive.

In any of the above arrangements the rotary mounting for the arm may comprise a column mounted on the base for rotation about a vertical axis and the balanced arm may be mounted for rotation on the column about a horizontal axis.

Also in any of the above arrangements the base may be of triangular form having wheel units at each apex thereof.

According to a further feature of the invention the arm may be extendable and may be counter-balanced throughout the range of extension/retraction with a camera on the arm.

In the latter arrangement motor means may be provided for driving at least certain of the base wheels and means may be provided for actuating the arm in response to extension thereof to follow the direction in which the camera is drawn by the operator and to maintain the extension of the arm within a predetermined limit.

BRIEF DESCRIPTION OF THE DRAWING FIGURES

The following is a description of a specific embodiment of the invention, reference being made to the accompanying drawings in which:

FIG. 1 is a side elevation view of a pedestal having a counter-balanced tiltable arm carrying a TV or video camera;

FIG. 2 is a plan view of the base of the pedestal which is supported on a steerable wheel unit which are steered by rotation of the arm showing the wheel units pointing in a straight ahead position; and FIG. 3 is a similar view to FIG. 2 showing the wheel units pointing to one side in accordance with the rotary position of the arm.

DETAILED DESCRIPTION OF THE INVENTION

Referring firstly to FIG. 1 of the drawings, there is shown a pedestal indicated generally by the reference numeral 10 comprising a base 11 upright column 12, tiltable extendable arm 13 and a carrier 14 at one end of the arm on which a TV/video camera 15 is mounted. Reference should be made to our EP-A-94900957.5 for a detailed description of the construction of the extendable arm, the means for counter-balancing the arm and the means for controlling tilting of the arm.

Briefly the column 12 is mounted at its lower end in bearings 16 mounted in a housing 17 on the base for rotation about a vertical axis 18 to provide azimuth rotation of the arm. The column has a forked upper part 19 having a pivot pin 20 extending between the upper ends of the forks on which the arm 13 is mounted for rotation about a horizontal axis defined by the pin. A control point 21 is provided from a part of the arm to one side of the column which engages in a vertical slot 22 of a guideway 23 which itself is constrained to move horizontally on a horizontal guideway 24. An extendable ram is mounted on the guideway 23 to act on the control point 21 together with a weight in the arm to counterbalance the arm throughout its range of extension and retraction as described in our EP-A-94900957.5.

The base 11 of the pedestal is of triangular form as seen in plan in FIGS. 2 and 3 and is supported on wheel units 30 disposed at the apices of the triangle and having mountings which are steerable about vertical axes 31.

The steerable wheel units are interconnected by means of a chain or belt 32 extending around the perimeter of the base and engaging over pulleys/sprockets 33 secured to the wheel mountings so that the wheels are maintained parallel at all times as indicated in FIGS. 2 and 3. The base of the pedestal thus moves in a crab like manner as it is steered over a floor.

As indicated above, the column 12 is supported for rotation in a bearing 16 in the base. The lower end of the column is connected by a chain/belt drive 34 extending around sprockets/pulleys fixed to the forward wheel-mounting on the base and to the lower end of the column. Thus, rotation of the column with the arm by the camera operator also steers the wheel units of the base so that as the operator draws the camera towards the object which he is viewing, so the base of the pedestal automatically follows behind him steering with the arm to follow the path taken by the camera operator.

In a modification of the apparatus described above, the wheel units supporting the base are motorised and a control system is provided for the wheel motors which is responsive to extension/retraction of the arm 13. The arrangement is such that as the arm is extended by the camera operator drawing the camera away from the pedestal, so the motor units are energised to cause the pedestal to be driven after the camera operator to maintain the extension of the arm within a predetermined limit so that the operator does not have the weight of the pedestal to draw behind him as he follows the subject which he is viewing.

The pedestal can also be provided with a conventional steering wheel encircling the pedestal and the wheel steering mechanism is selectively couplable either to the arm 13 or the wheel.

I claim:

1. A pedestal for a TV, video, or cinematographic camera having a base mounted on steerable wheel units, means for steering said wheel units for moving said base in a desired direction and a carrier for supporting a camera on said base in the form of a counter-balanced arm mounted on said base to rotate about a vertical axis and to tilt about a horizontal axis, wherein said steering means is coupled to said arm and said steerable wheel units so that rotation of said arm about said vertical axis causes a corresponding steering movement of said steerable wheel units, wherein the direction in which said steerable wheel units are steered is in alignment with a horizontal direction of said arm so that as said base is moved by an operator in said horizontal direction, said pedestal follows that direction.

2. A pedestal as claimed in claim 1, wherein said base is supported on a number of spaced steerable wheel units all of which are rotatably mounted on said base for steering about vertical axes and at least certain of which are coupled to a rotary mounting of said arm on said base to be steered thereby.

3. A pedestal as claimed in claim 2, wherein all of said steerable wheel units are coupled to the rotary mounting to be steered thereby so that all of said wheel units are aligned in parallel with one another and are steered collectively.

4. A pedestal as claimed in claim 2, wherein a belt or chain drive interconnects said steerable wheel units to steer together.

5. A pedestal as claimed in claim 1, wherein a drive means is provided for connecting said rotary mounting of the arm to one of said steerable wheel units to transmit rotation of said mounting with said arm to said steerable wheel units.

6. A pedestal as claimed in claim 5, wherein said drive means between said rotary mounting and said steerable wheel unit comprises a toothed belt/chain drive.

7. A pedestal as claimed in claim 1, wherein said rotary mounting for said arm comprises a column mounted on said base for rotation about said vertical axis and wherein said counter-balanced arm is mounted for rotation on said column about said horizontal axis.

8. A pedestal as claimed in claim 1, wherein said base is of triangular form having steerable wheel units at each apex thereof.

9. A pedestal as claimed in claim 1, characterized in that said arm is extendable and is counter-balanced throughout its range of extension/retraction with a camera on said arm.

10. A pedestal as claimed in claim 9, characterized in that motor means are provided for driving at least certain of said base steerable wheel units, and means are provided for activating said motor means in response to extension of said arm to follow the direction in which said base is drawn by the operator and, to maintain the extension of said arm within a predetermined limit.

11. A pedestal as claimed in claim 1, wherein a steering wheel encircling said pedestal is provided and means are provided for selectively coupling one of said counter-balanced arm and said steering wheel to said means for steering said base.

* * * * *